United States Patent
DeVries et al.

(10) Patent No.: US 11,598,299 B1
(45) Date of Patent: Mar. 7, 2023

(54) FUEL FILTER

(71) Applicant: Exergy Engineering LLC, Grand Rapids, MI (US)

(72) Inventors: Philip J. DeVries, Caledonia, MI (US); Randall C. Harkema, Caledonia, MI (US); Mike Van Allsburg, Dorr, MI (US)

(73) Assignee: Exergy Engineering LLC, Grand Rapids, MI (US)

( * ) Notice: Subject to any disclaimer, the term of this patent is extended or adjusted under 35 U.S.C. 154(b) by 497 days.

(21) Appl. No.: 15/879,099

(22) Filed: Jan. 24, 2018

Related U.S. Application Data

(60) Provisional application No. 62/449,889, filed on Jan. 24, 2017.

(51) Int. Cl.
  *F02M 37/22* (2019.01)
  *B01D 63/06* (2006.01)
  *F02M 59/46* (2006.01)

(52) U.S. Cl.
  CPC .......... *F02M 37/22* (2013.01); *B01D 63/062* (2013.01); *F02M 59/46* (2013.01)

(58) Field of Classification Search
  None
  See application file for complete search history.

(56) References Cited

U.S. PATENT DOCUMENTS

| | | | | |
|---|---|---|---|---|
| 4,941,612 | A * | 7/1990 | Li | F02M 57/02 239/124 |
| 5,238,192 | A * | 8/1993 | McNair | F02M 37/22 239/575 |
| 5,817,234 | A * | 10/1998 | Dye | B01D 29/21 210/232 |
| 6,446,885 | B1 * | 9/2002 | Sims, Jr. | F02M 51/0682 239/585.4 |
| 9,816,493 | B2 | 11/2017 | Van Allsburg et al. | |
| 2007/0017370 | A1 * | 1/2007 | Clausen | B01D 36/003 96/4 |
| 2008/0135469 | A1 * | 6/2008 | Fremont | B01D 29/21 210/234 |
| 2011/0174704 | A1 * | 7/2011 | Yamada | B01D 29/114 210/137 |
| 2017/0144128 | A1 * | 5/2017 | Carrion | B01D 46/543 |

OTHER PUBLICATIONS

Images of fuel filters publicly used prior to Jan. 24, 2017.
Bosch CP4 brochure disclosing Bosch CP4 Fuel Pump publicly available prior to Jan. 24, 2017.

(Continued)

*Primary Examiner* — Jonathan M Peo
(74) *Attorney, Agent, or Firm* — Gardner, Linn, Burkhart & Ondersma LLP

(57) ABSTRACT

A fuel filter for a fuel system includes a cylindrical frame having a pair of circular openings at longitudinal ends of the frame and a filter membrane, with the frame including a circumferential wall having an aperture and the filter membrane being disposed about an outwardly facing side of the wall and over the aperture. The frame includes tabs, such as deformable tabs, disposed adjacent at the openings for retaining the filter membrane on the frame, and the filter membrane overlaps itself when circumferentially disposed about the wall.

20 Claims, 8 Drawing Sheets

(56) References Cited

OTHER PUBLICATIONS

Image of Bosch CP4 pump publicly available prior to Jan. 24, 2017.
Cross section image of Bosch CP4.2 pump publicly available prior to Jan. 24, 2017.
Cross section image of Bosch CP4.1 pump publicly available prior to Jan. 24, 2017.

\* cited by examiner

FUEL FILTER

CROSS REFERENCE TO RELATED APPLICATION

The present application claims priority of U.S. provisional application Ser. No. 62/449,889 filed Jan. 24, 2017, which is hereby incorporated herein by reference in its entirety.

BACKGROUND OF THE INVENTION

The present invention is directed to a fuel filter, and in particular to a fuel filter used with a fuel pump and a proportional inlet valve.

Fuel pumps for engines are used to supply pressurized fuel as part of the fuel system of the engine. For example, a common rail fuel pump operates to supply pressurized fuel to a fuel rail that is in turn connected with individual injectors, such as solenoid operated injectors, that deliver fuel to the individual cylinders of an engine.

SUMMARY OF THE INVENTION

The present invention provides a fuel filter for use with a fuel pump having a proportional inlet valve, with the fuel filter configured to filter fuel delivered to the valve.

According to an aspect of the present invention, a fuel filter includes a frame and a filter membrane, with the frame including a circumferential wall and the filter membrane being disposed about an outwardly facing side of the wall. The wall includes multiple apertures, wherein in one embodiment the apertures are formed as circular holes that are circumferentially disposed about the wall.

In the illustrated embodiment the fuel filter is generally cylindrical with a pair of circular openings at longitudinal ends of the frame. The frame may include at least one tab disposed at the openings, with the tabs configured to retain the filter membrane about the wall of the frame. In the illustrated embodiment the frame is metallic with the tabs being generally ring shaped and circumferentially disposed about the openings, with the tabs being deformable to retain the filter membrane in a groove on the outwardly facing side of the wall. Also in the illustrated embodiment, the filter membrane overlaps itself when circumferentially disposed about the wall.

The fuel filter is configured for use with a fuel pump having a fuel pump body that includes a fuel passage, and includes an electronically actuated proportional inlet valve having an end that is inserted into a cavity of the fuel pump body, with the fuel filter being mounted to an end of the valve.

An alternative fuel filter comprises a substantially cylindrical metallic frame about which is disposed a filter membrane.

The fuel filters provide a robust method of filtering fuel for supply to an inlet valve and fuel pump, which may be employed with increased performance pumps utilizing higher pressure and/or higher volumes of fuels, or may be used with conventional fuel pump arrangements for improved prevention of debris contamination. The filters are less susceptible to failure than conventional factory supplied filters, thus inhibiting debris from entering the fuel system that may otherwise contaminate or damage the fuel injectors supplied by the pump.

These and other objects, advantages, purposes and features of this invention will become apparent upon review of the following specification in conjunction with the drawings.

DESCRIPTION OF THE PREFERRED EMBODIMENTS

Figure 1A:
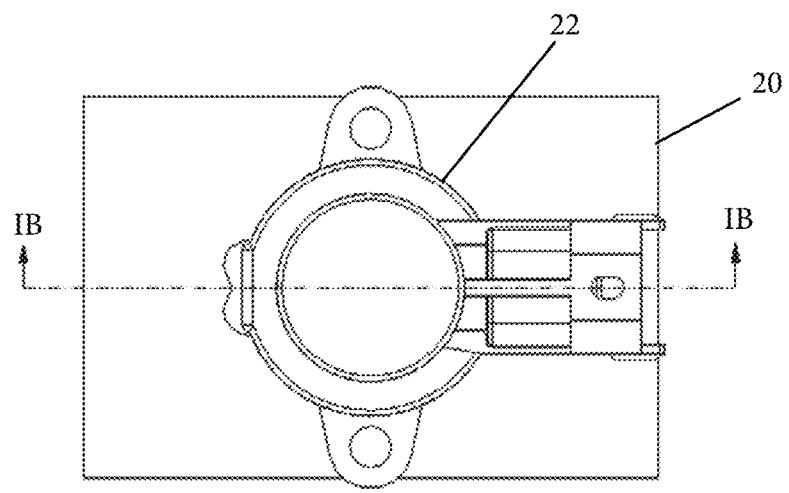
FIG. 1A is a partial top plan view of a fuel pump to which a proportional inlet valve and fuel filter is installed in accordance with an aspect of the present invention.
Figure 1B:
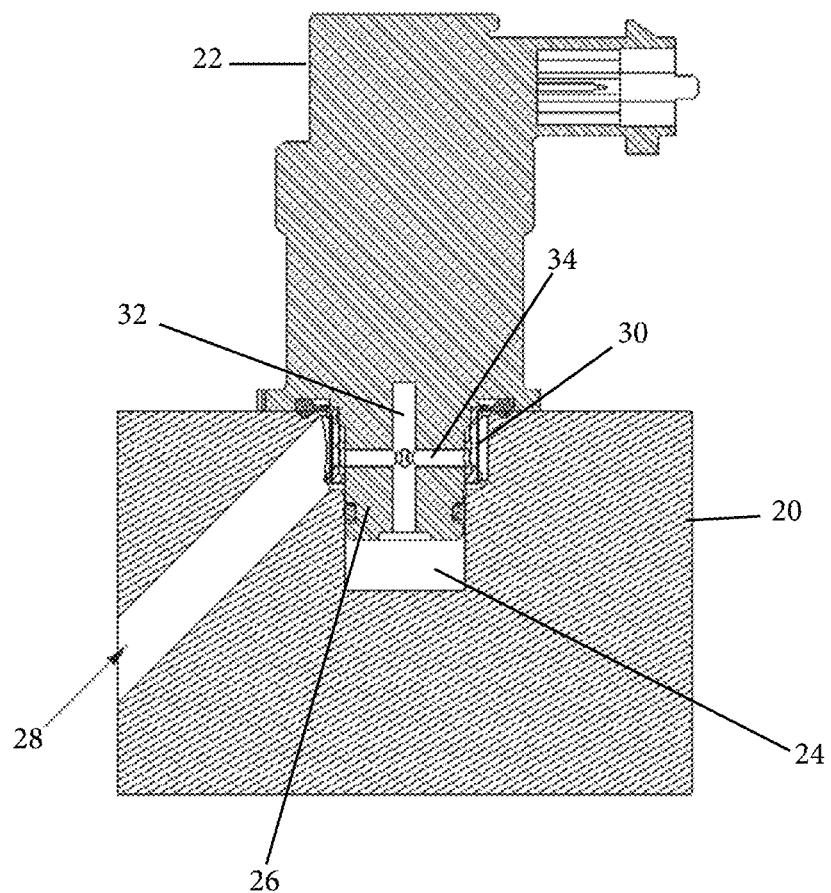
FIG. 1B is a side cross sectional view of the fuel pump with the proportional inlet valve and fuel filter of FIG. 1A taken along the line IB-IB of FIG. 1A.
Figure 2:
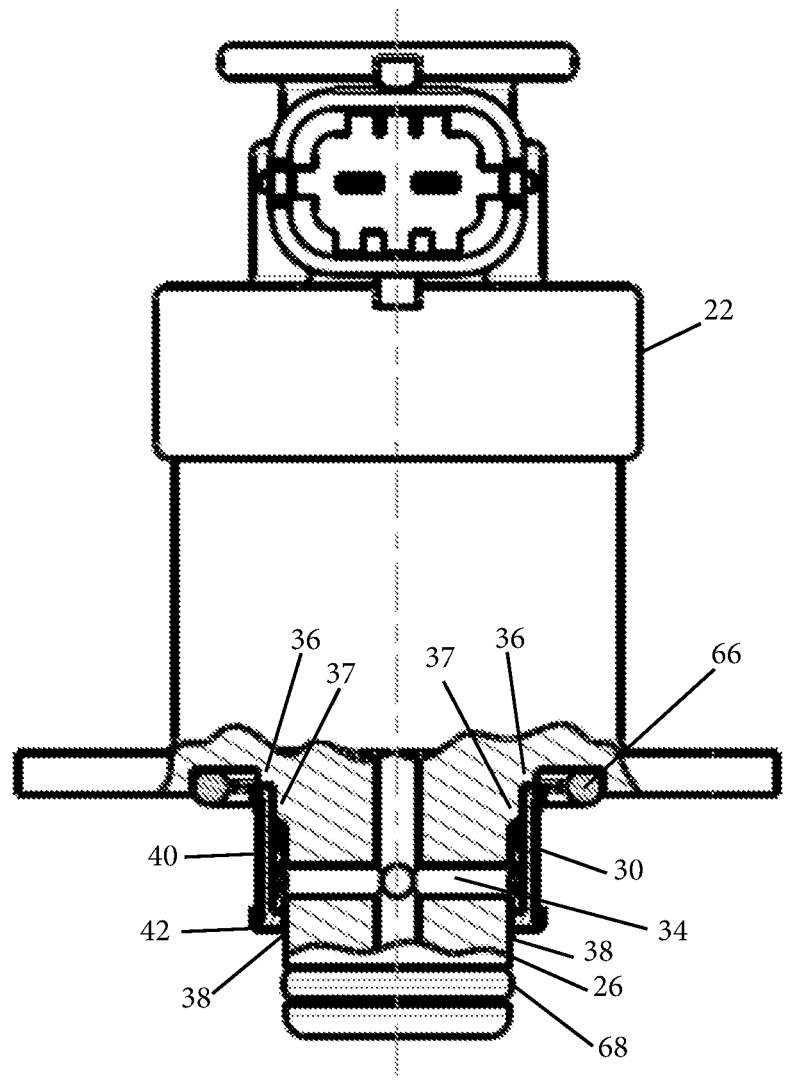
FIG. 2 discloses the inlet valve and fuel filter removed from the fuel pump of FIG. 1A with a lower portion of the inlet valve and filter shown in section.
Figure 3:
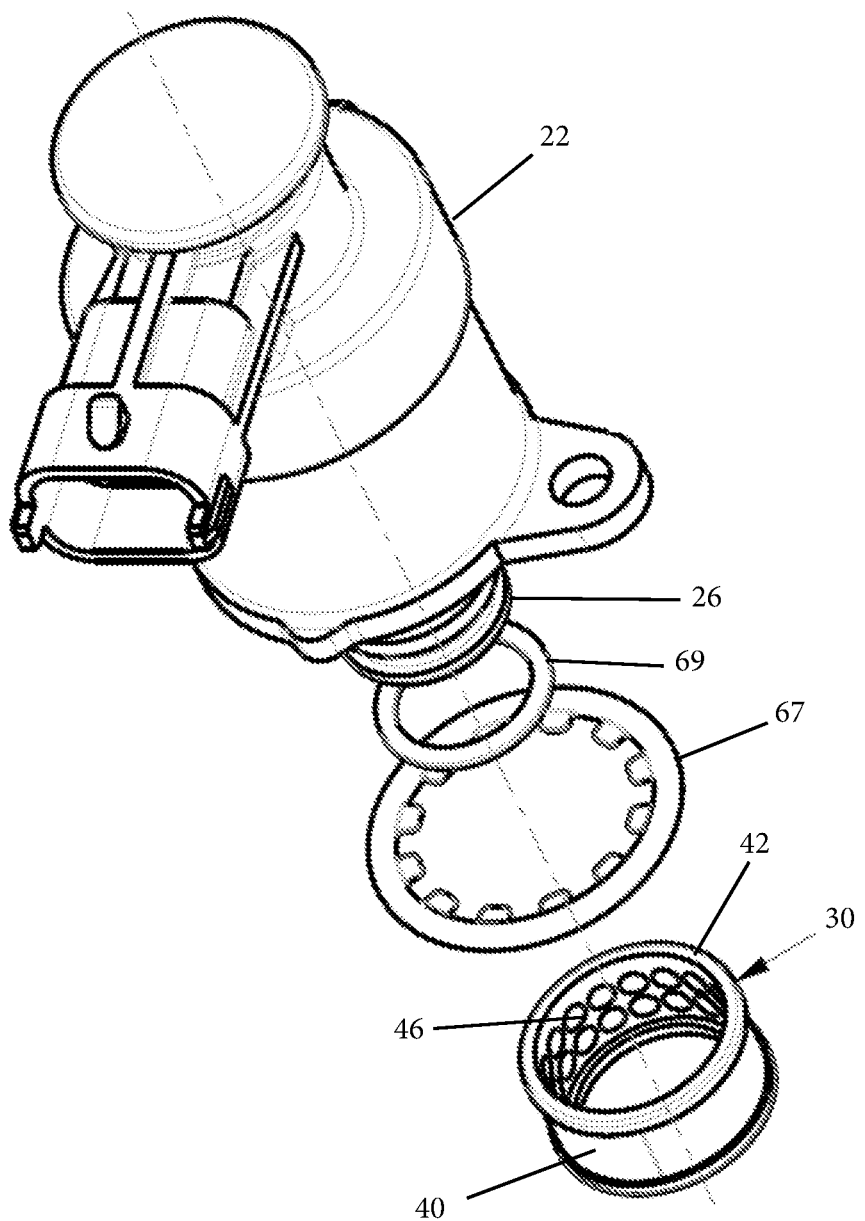
FIG. 3 is an exploded perspective view of the inlet valve and filter of FIG. 2.

The present invention will now be described with reference to the accompanying figures, wherein the numbered elements in the following written description correspond to like-numbered elements in the figures. A fuel pump body 20 is partially shown in FIGS. 1A and 1B with an electronically actuated proportional inlet valve 22 mounted within a cavity 24 of body 20, and in particular an end 26 of valve 22 is inserted into cavity 24. Body 20 includes a fuel passage 28 through which fuel is supplied to valve 22. As further understood from FIGS. 2 and 3, a fuel filter 30 is installed to end 26 of valve 22 whereby fuel delivered through fuel passage 28 is filtered by filter 30 prior to the fuel being delivered to valve 22 and, in turn, the fuel pump 20. In the illustrated embodiment, as discussed in more detail below, filter 30 comprises a strengthened filter 30 that resists higher fuel pressures, supply flow, and/or contaminant levels. The filter 30 may be used with increased performance fuel pumps, or conventional fuel pumps, to provide added protection against fuel system contamination.

In the illustrated embodiment fuel pump 20 is a Bosch CP4 fuel pump, such as a CP4.1, 4.2 or 4.3 fuel pump, with valve 22 also being supplied by Bosch. Valve 22 may additionally be referred to as an injection pressure regulator, fuel control actuator, or fuel flow metering unit. In operation, valve 22 operates to control the output fuel flow of the fuel pump 20, and thereby the pressure in the high pressure system by way of an internal, ported sleeve, and armature (not shown). As understood from FIG. 2, end 26 of valve 22 thus includes internal fuel passages 32, 34. End 26 is generally cylindrical and includes a shoulder 36 against which filter 30 engages, with filter 30 correspondingly engaging with a cylindrical wall 38 opposite shoulder 36 whereby filter 30 is disposed over or about passage 34. Fuel delivered via fuel passage 28 to valve 22 thus flows through filter 30 and into valve 22. It should be appreciated that fuel filters in accordance with present invention may be employed with alternatively configured fuel pumps and valves.

Figure 4A:
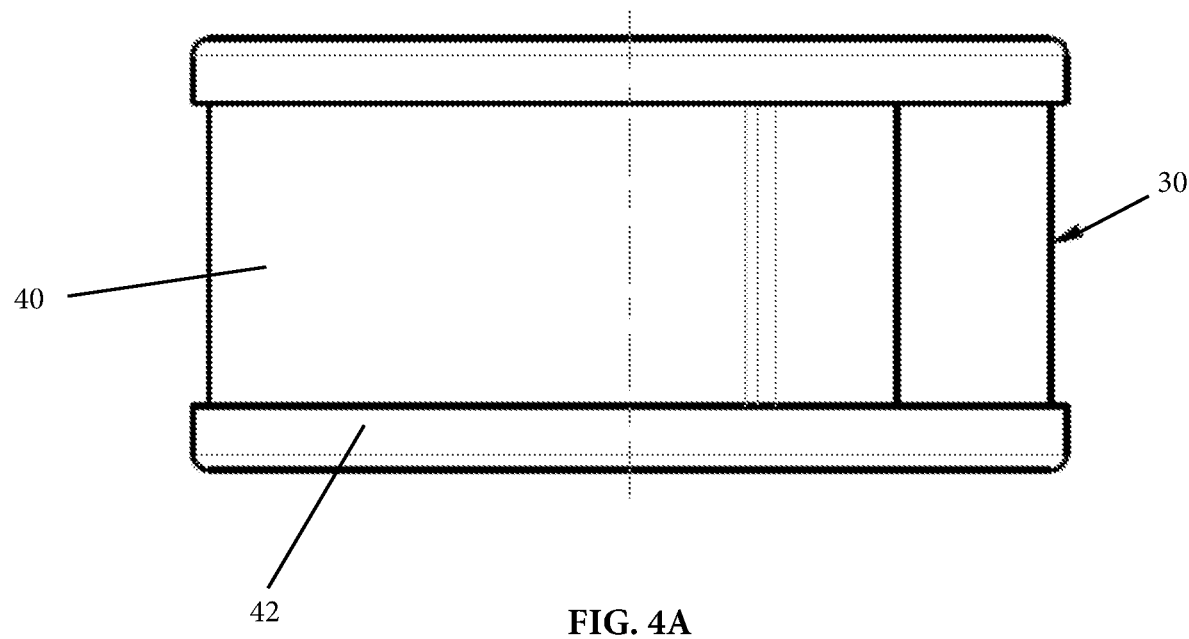
FIG. 4A is a side elevation view of the fuel filter of FIG. 2.
Figure 4B:
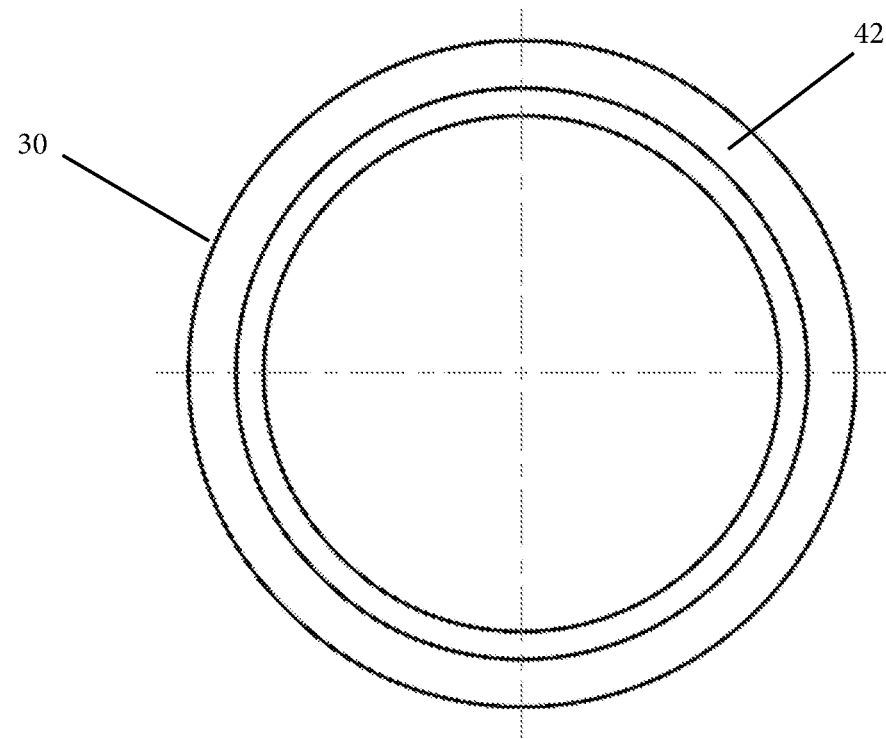
FIG. 4B is a top plan view of the fuel filter of FIG. 4A.
Figure 5:
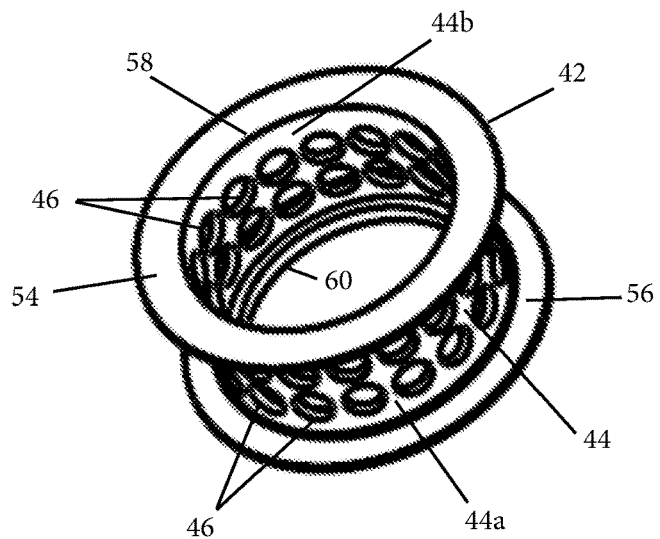
FIG. 5 is a perspective view of the spool of the fuel filter of FIG. 2.
Figure 6:
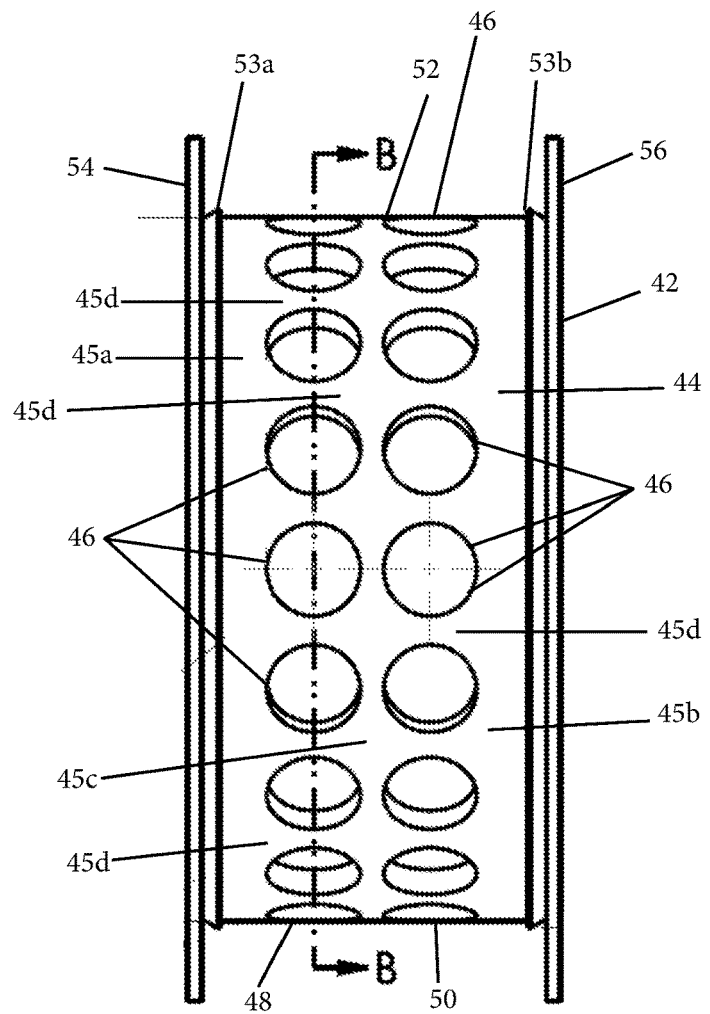
FIG. 6 is a side elevation view of the spool of FIG. 5.
Figure 7:
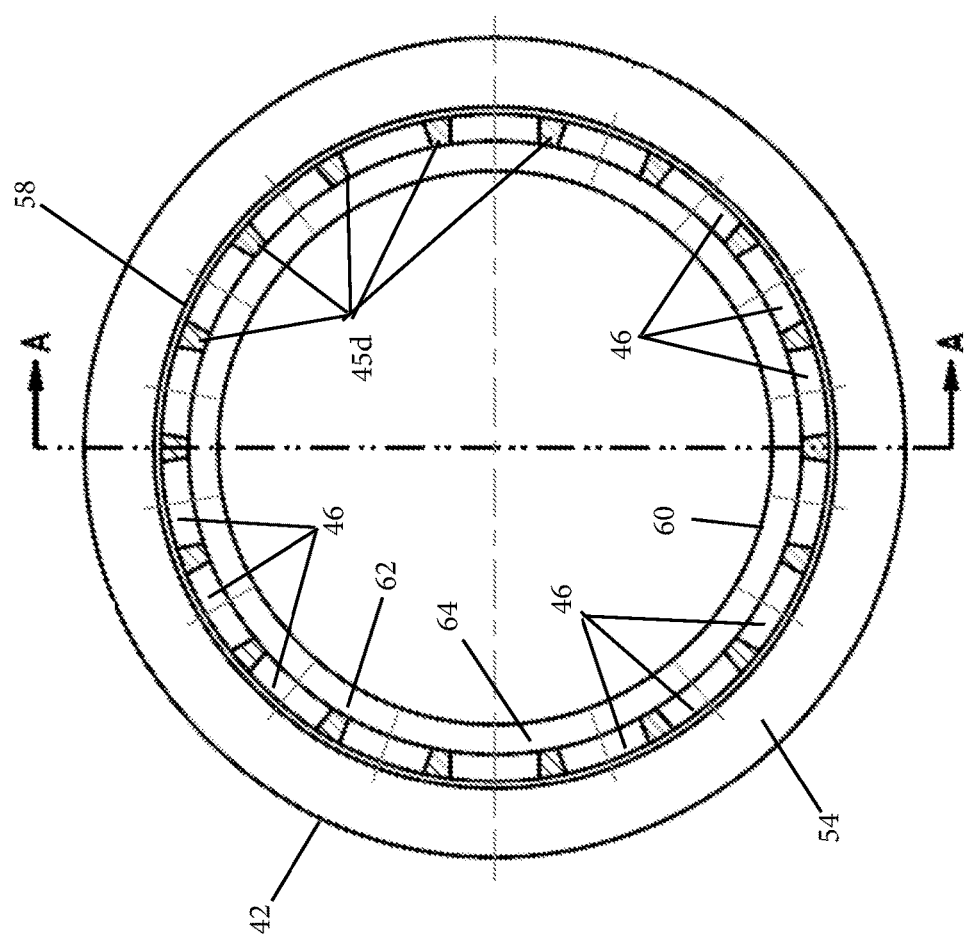
FIG. 7 is a sectional elevation view of the spool taken along the line B-B of FIG. 6.

Referring now to FIGS. 4A and 4B, fuel filter 30, which may also be referred to as a fuel filter assembly, is shown to comprise an assembly that includes a filter membrane 40 and a frame or spool 42 to which membrane 40 is mounted. As discussed in more detail below, frame 42 is constructed of a metallic material, which in the illustrated embodiment comprises stainless steel, to provide strength to the filter 30, with frame 42 being unitarily constructed to form an integral one-piece frame 42. Membrane 40 comprises a porous screen having openings that are approximately 20 microns, such as may be measured across the opening, with membrane 40 being disposed about frame 42 and retained in place on frame 42, as discussed in more detail below. It should be appreciated that membranes may be provided having alternatively sized openings, such as for example between 5 microns to 30 microns. For example, an alternative membrane may be provided having openings that are approximately 25 microns, and in a still further embodiment a membrane may be provided having openings that are approximately 10 microns.

The illustrated embodiment of frame 42 is disclosed in detail in FIGS. 5-8. As there shown, frame 42 comprises a cylindrical member having a cylindrical or circumferential wall 44, with wall 44 having an outer or external surface or side 44a and an inner or internal surface or side 44b. Wall 44 in turn includes multiple apertures in the form of through holes 46 disposed therein, where holes 46 allow fuel to be supplied from external of filter 30 to the internal space of filter 30 circumscribed by wall 44. In the embodiment shown wall 44 includes two rows 48, 50 of holes 46 disposed about the circumference of wall 44, with each row 48, 50 including eighteen holes 46, and with each hole having a diameter of approximately 0.10 inches. It should be appreciated, however, that alternatively configured apertures may be employed, including number, shape, size and location of such apertures. As also understood from FIG. 6, wall 44 includes wall portions 45a, 45b and 44c that are disposed outside of and between the rows 48, 50 of holes 46, where wall portions 45a, 45b and 44c do not include apertures and thus define solid circumferential wall portions. Still further, wall 44 includes multiple axial or longitudinal wall portions 45d extending from wall portion 45a to wall portion 45b between the apertures formed by holes 46. In the illustrated embodiment frame 42 includes eighteen such longitudinal wall portions 45d, where reference to longitudinal refers to the axial orientation of the cylindrical orientation of frame 42.

Frame 42 further includes an external groove 52 disposed about wall 44 and within which filter membrane 40 is located when assembled, as discussed in more detail below. Groove 52 is formed in part by a pair of circumferential and radially projecting shoulders 53a, 53b disposed on either side of groove 52. In the illustrated embodiment groove 52 has a width of approximately 0.33 inches, but could be alternatively sized including depending on the size of the valve to which the filter is mounted.

Frame 42 additionally includes initially outwardly extending tabs 54, 56 that in the illustrated embodiment are circumferentially disposed about openings 58, 60 of frame 42, where in the illustrated embodiment the openings 58, 60 define axial or longitudinal ends of the frame 42. Shoulders 53a, 53b are disposed inwardly of tabs 54, 56, with an angled and inwardly extending relief 55a, 55b being formed at each of shoulders 53a, 53b, respectively. Tabs 54, 56 are configured to be inwardly deformed or wrapped about shoulders 53a, 53b to retain filter membrane 40 within groove 52. Tabs 54, 56 thus include a base 54b, 56b and an outer edge 54a, 56a, where bases 54b, 56b are disposed adjacent shoulders 53a, 53b. When inwardly deformed about shoulders 53a, 53b, tabs 54, 56 are configured to cover wall portions 45a, 45b such that edges 54a, 56a substantially do not cover holes 46. That is, when folded over, tabs 54, 56 do not cover holes 46 or do not cover a significant portion of holes 46 to thereby enable the fuel system to operate appropriately and prevent insufficient fuel from flowing into or through valve 22. In the illustrated embodiment tabs 54, 56 are disclosed as continuous rings about openings 58, 60, with opening 60 having a diameter of approximately 0.63 inches. It should be appreciated, however, that alternative tabs may be employed for retaining the filter membrane 40 within the scope of the present invention.

Figure 8:
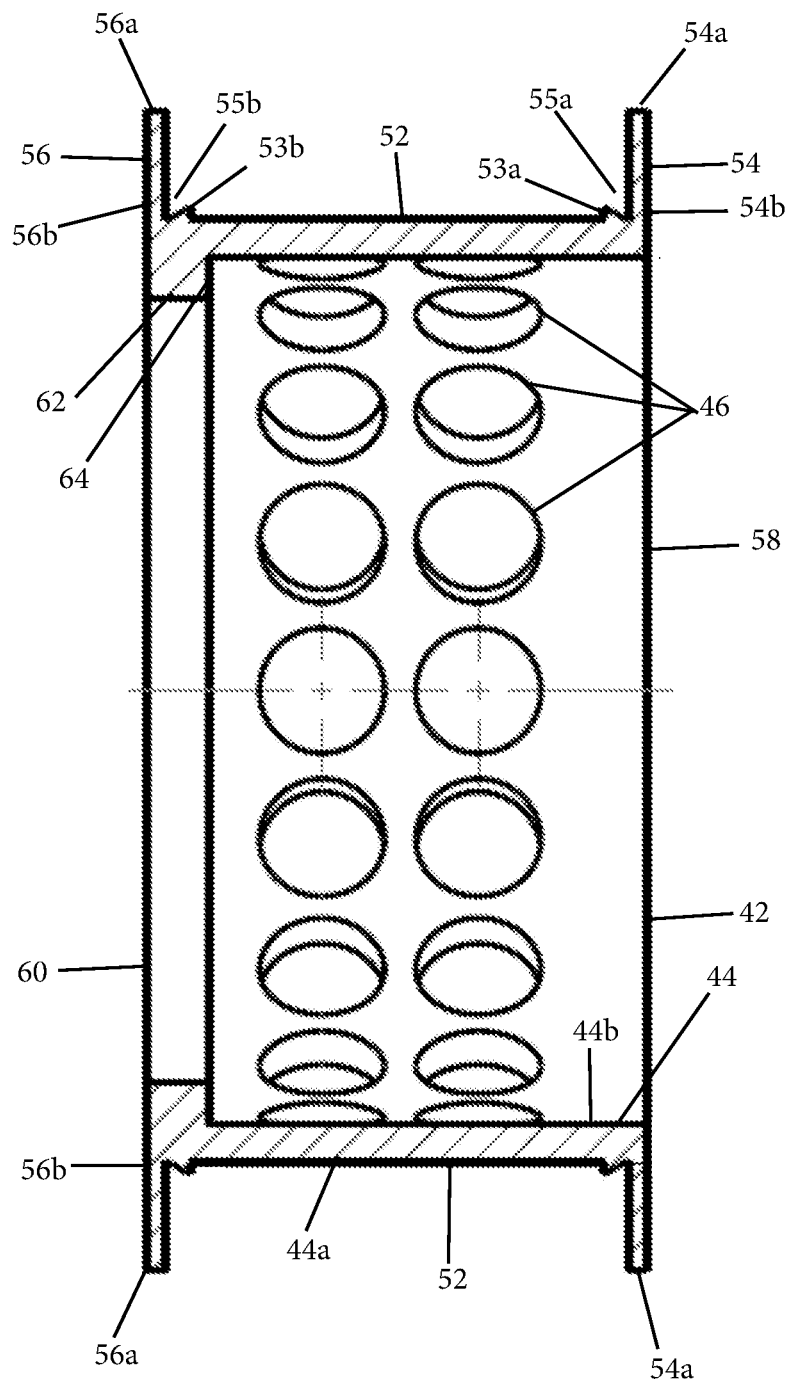
FIG. 8 is a sectional elevation view of the spool taken along the line A-A of FIG. 7.

As best understood from FIG. 8, frame 42 includes an internal shoulder 62 adjacent or at opening 60. Shoulder 62 is formed on an internal diameter of wall 44, with shoulder 62 being formed such that opening 60 has a smaller diameter than opening 58. In particular, shoulder 62 defines an internal ledge 64 relative to the inside diameter of wall 44. As noted, the frame may be alternatively sized including depending on the size of the valve to which the filter is mounted.

In the illustrated embodiment, frame has a longitudinal height of approximately 0.40 inches and wall 44 defines an outer diameter of approximately 0.75 inches and an inner diameter of approximately 0.69 inches, with tabs 54, 56 initially extending radially outwardly approximately 0.09 inches beyond the outer diameter defined by wall 44.

Figures 9, 10:
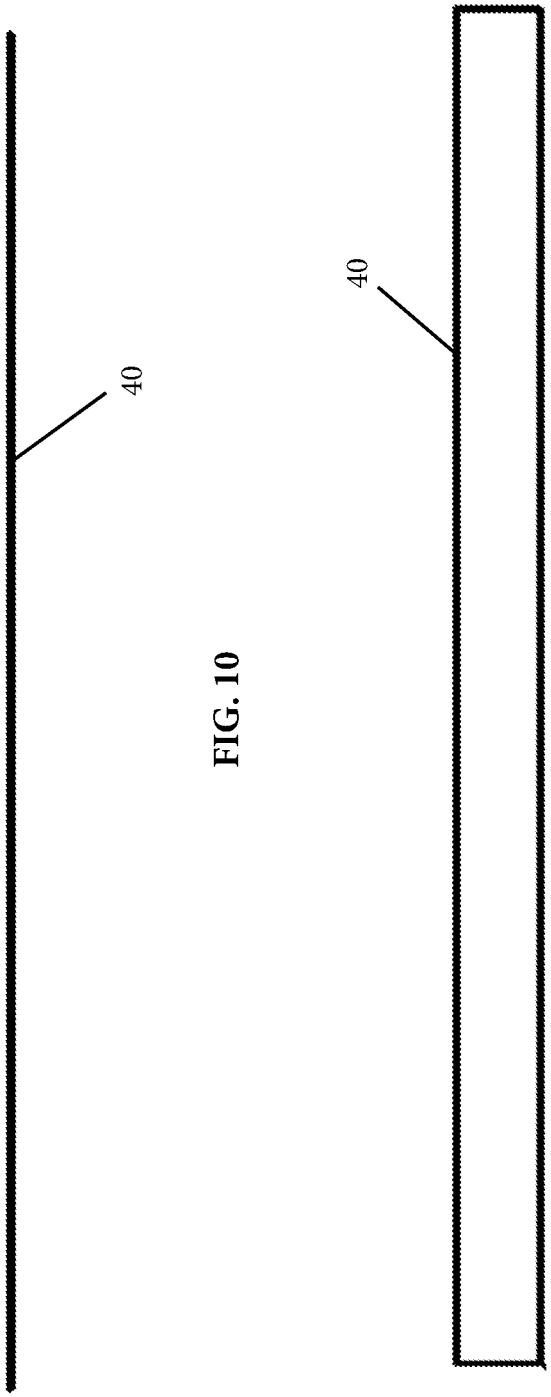
FIG. 9 is a top plan view of the filter membrane of the fuel filter of FIG. 2 shown in an unrolled orientation.
FIG. 10 is a side profile view of the filter membrane of FIG. 9.

Referring now to FIGS. 9 and 10, filter membrane 40 is initially configured as a flat wire mesh prior to being disposed about frame 42. As noted above, membrane 40 is configured to be disposed within groove 52, whereby the width of membrane 40 is sized to fit within or between shoulders 53a, 53b. In the illustrated embodiment membrane 40 is formed of a filtering stainless steel wire cloth and is configured to have a thickness of approximately 0.006 inches and a length when flat of approximately five inches between the distal ends of membrane 40. Membrane 40 may thus be wrapped about the external diameter of wall 44 within groove 52 approximately two times such that there is substantial overlap of membrane 40 with respect to itself. Membrane 40 thus forms approximately two filter membrane layers when disposed about frame 42. That is membrane forms at least two layers on filter 30. It should be appreciated, however, that alternative lengths and configurations of a filter membrane may be employed. Upon wrapping filter membrane 40 about frame 42 within groove 52, tabs 54, 56 are then inwardly deformed to retain membrane 40 fixedly and securely in place. Wall 44 thus supports membrane 40 relative to the fuel being delivered to valve 22 during operation, including wall portions 45c and 45d.

Referring again to FIGS. 2 and 3, fuel filter 30 is pressed on to end 26 of valve 22, with larger diameter opening 58 initially being disposed over end 26 to engage against shoulder 36 of valve 22 and with a larger diameter portion of end 26 defined by wall 37. Shoulder 62 of frame 42 thus engages with the smaller diameter portion of end 26 defined by wall 38 of valve 22 at the opposite end of filter 30. Valve 22 is provided with a pair of seals, such as o-rings 66, 68, that provide seals relative to the fuel supplied via fuel passage 28 of fuel pump 20. Still further, one or more gaskets 67, 69 may additionally be employed for sealing and/or retention.

The fuel filters of the present invention provide a robust method of filtering fuel for supply to a proportional inlet valve and fuel pump, which may be employed with increased performance pumps utilizing higher pressure and/or higher volumes of fuels, or may be used with conventional fuel pump arrangements for improved prevention of debris contamination. The robust filters are significantly less susceptible to failure than conventional factory supplied filters, thus inhibiting debris from entering the fuel system that may otherwise contaminate or destroy the fuel injectors supplied by the pump.

As noted above, in the illustrated embodiment frame 42 is constructed from a metallic material. An alternative frame may, however, be constructed from other materials, such as in the form of a plastic injection molded component. Such a plastic frame may be of generally similar overall geometrical configuration as frame 42, such as to include an internal or inner wall with the filter membrane being disposed over an exterior surface of the wall. The wall may include alternatively configured apertures through which fuel is supplied, such as for example, vertically oriented openings. Such a frame would additionally be generally cylindrical with a pair of openings and an internally formed ledge or lip adjacent one of the openings for mounting of the filter assembly.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A fuel filter comprising:
   a cylindrical frame having a pair of circular openings at longitudinal ends of said frame; and
   a filter membrane;
   said frame including a circumferential wall extending between and defining said circular openings and having solid wall portions and at least one aperture with said filter membrane being disposed about an outwardly facing side of said wall and disposed over said at least one aperture, wherein said solid wall portions support said filter membrane against said wall;
   wherein said filter membrane comprises a flat wire mesh membrane wrapped about said wall to form an outer cylindrical surface and an inner cylindrical surface; and
   wherein said frame further comprises a radially outwardly projecting first tab disposed at one of said circular openings and a radially outwardly projecting second tab disposed at the other said circular opening, and wherein said first tab and said second tab are unitarily formed with said wall and are deformed to extend along a portion of an axial length of said wall with both said first tab and said second tab extending over separate portions of said filter membrane whereby said filter membrane is retained to said wall to filter fuel passing through said filter membrane.

2. The fuel filter of claim 1, wherein said at least one aperture comprises a plurality of apertures circumferentially disposed about said wall and at least a portion of said solid wall portions extend between said longitudinal ends of said frame.

3. The fuel filter of claim 2, wherein said plurality of apertures comprise rows of apertures.

4. The fuel filter of claim 1, wherein said first tab is generally ring shaped and circumferentially extends about said one of said circular openings.

5. The fuel filter of claim 4, wherein said second tab is generally ring shaped and circumferentially extends about said other of said circular openings.

6. The fuel filter of claim 1, wherein said wall includes a groove on said outwardly facing side of said wall, and wherein said filter membrane is disposed in said groove.

7. The fuel filter of claim 1, wherein said frame is constructed of a metallic material.

8. The fuel filter of claim 1, wherein said filter membrane overlaps itself when circumferentially disposed about said wall.

9. The fuel filter of claim 8, wherein said filter membrane approximately completely overlaps itself when circumferentially disposed about said wall whereby approximately two layers of said filter membrane are disposed about said wall.

10. The fuel filter of claim 1, wherein said filter membrane has openings between 5 to 30 microns in size.

11. A fuel filter comprising:
    a metallic frame, said frame being cylindrical with a pair of circular openings at longitudinal ends of said frame, and with said frame including a circumferential wall extending between and defining said circular openings and having solid wall portions and a plurality of apertures; and
    a filter membrane;
    said filter membrane comprising a flat wire mesh membrane wrapped about an outwardly facing side of said wall to form an outer cylindrical surface and an inner cylindrical surface, wherein said wall includes a groove on said outwardly facing side of said wall and said filter membrane is disposed in said groove and said solid wall portions support said filter membrane against said wall, wherein said filter membrane is disposed over the plurality of apertures and wherein said frame further includes a separate radially outwardly projecting tab disposed at each of said circular openings, wherein the tabs are unitarily formed with said wall and are deformed to extend along a portion of an axial length of said wall with both said tabs extending over separate portions of said filter membrane to retain said filter membrane about said wall to filter fuel passing through said filter membrane.

12. The fuel filter of claim 11, wherein said tabs are generally ring shaped and circumferentially extend about respective ones of said circular openings.

13. The fuel filter of claim 11, wherein said filter membrane overlaps itself when circumferentially disposed about said wall, and wherein said wall includes a plurality of apertures circumferentially disposed about said wall.

14. A fuel pump assembly, said fuel pump assembly comprising:
    a fuel pump body, said fuel pump body including a fuel passage;
    a proportional inlet valve, said proportional inlet valve having an end inserted into a cavity of said fuel pump body, wherein fuel delivered by said fuel pump assembly passes through said fuel passage to said proportional inlet valve with said proportional inlet valve configured to control an output fuel flow of said fuel pump assembly; and
    a fuel filter, said fuel filter being mounted to said end of said proportional inlet valve whereby the fuel delivered through said fuel passage is filtered by said fuel filter;

said fuel filter comprising a cylindrical frame having a pair of circular openings at longitudinal ends of said frame with said end of said proportional inlet valve being inserted through said pair of circular openings such that said frame is disposed about said end of said proportional inlet valve when said fuel filter is mounted thereto; and a filter membrane;

said frame including a circumferential wall having solid wall portions and at least one aperture with said filter membrane being disposed about an outwardly facing side of said wall and disposed over said at least one aperture, wherein said solid wall portions support said filter membrane against said wall, and wherein said filter membrane comprises a flat wire mesh membrane wrapped about said outwardly facing side of said wall to form an outer cylindrical surface and an inner cylindrical surface, and wherein said frame further comprises a radially outwardly projecting first tab disposed at one of said circular openings and a radially outwardly projecting second tab disposed at the other said circular opening, and wherein said first tab and said second tab are unitarily formed with said wall and are deformed to extend along a portion of an axial length of said wall with both said first tab and said second tab extending over separate portions of said filter membrane whereby said filter membrane is retained to said wall of said frame.

15. The fuel pump assembly of claim 14, wherein said at least one aperture comprises a plurality of apertures circumferentially disposed about said wall and at least a portion of said solid wall portions extend between said longitudinal ends of said frame.

16. The fuel pump assembly of claim 14, wherein said first tab is generally ring shaped and circumferentially extends about said one of said circular openings, and wherein said second tab is generally ring shaped and circumferentially extends about said other of said circular openings.

17. The fuel pump assembly of claim 14, wherein said wall includes a groove on said outwardly facing side of said wall, and wherein said filter membrane is disposed in said groove.

18. The fuel pump assembly of claim 14, wherein said frame is constructed of a metallic material.

19. The fuel pump assembly of claim 14, wherein said filter membrane overlaps itself when circumferentially disposed about said wall.

20. The fuel pump assembly of claim 14, wherein said filter membrane has openings between 5 to 30 microns in size.

* * * * *